(12) United States Patent
Tao et al.

(10) Patent No.: US 6,460,356 B1
(45) Date of Patent: Oct. 8, 2002

(54) HVAC CONTROL SYSTEM FOR A MULTIZONED VEHICLE

(75) Inventors: Michikazu Jody Tao, Maple Valley, WA (US); Richard Paul Bertalan, El Paso, TX (US); Steven L. Baker, Bothell, WA (US)

(73) Assignee: PACCAR Inc., Bellevue, WA (US)

( * ) Notice: Subject to any disclaimer, the term of this patent is extended or adjusted under 35 U.S.C. 154(b) by 0 days.

(21) Appl. No.: 09/970,031

(22) Filed: Oct. 2, 2001

(51) Int. Cl.[7] .............................. F25B 7/00; G05D 23/00
(52) U.S. Cl. ............................................. 62/175; 236/51
(58) Field of Search .......................... 62/175, 178, 244; 236/51, 1 B; 165/202, 203, 204, 205

(56) References Cited

U.S. PATENT DOCUMENTS

| | | |
|---|---|---|
| 4,382,463 A | 5/1983 | Ikebukuro |
| 4,460,036 A | 7/1984 | Yoshimi et al. |
| 4,473,109 A | 9/1984 | Kojima et al. |
| 4,477,018 A | 10/1984 | Rathgeber |
| 4,537,245 A | 8/1985 | Nishimura et al. |
| 4,570,450 A | 2/1986 | Takemi et al. |
| 4,762,170 A | 8/1988 | Nijjar et al. |
| 4,800,951 A | 1/1989 | Sakurai |
| 4,825,663 A | 5/1989 | Nijjar et al. |
| 4,843,084 A * | 6/1989 | Parker et al. ............... 364/505 |
| 4,931,948 A * | 6/1990 | Parker et al. ............... 364/505 |
| 4,949,779 A | 8/1990 | Kenny et al. |
| 5,016,704 A | 5/1991 | Ono |
| 5,086,628 A | 2/1992 | Hashimoto |
| 5,181,653 A * | 1/1993 | Foster et al. ............... 236/49.3 |
| 5,333,678 A | 8/1994 | Mellum et al. |
| 5,361,984 A * | 11/1994 | Annerstedt et al. ........ 236/49.3 |
| 5,619,862 A | 4/1997 | Ruger et al. |
| 5,642,856 A | 7/1997 | Samukawa et al. |
| 5,715,997 A | 2/1998 | Ito et al. |
| 5,725,052 A | 3/1998 | Kawai et al. |
| 5,810,245 A * | 9/1998 | Heitman et al. ........... 236/49.3 |
| 5,873,520 A | 2/1999 | Ratgeber et al. |
| RE36,437 E | 12/1999 | Hanson et al. |
| 6,003,593 A | 12/1999 | Halligan |
| 6,038,877 A | 3/2000 | Peiffer et al. |
| 6,126,080 A * | 10/2000 | Wada ............................ 236/51 |
| 6,301,909 B1 * | 10/2001 | Hayasaka ..................... 62/175 |
| 2001/0032476 A1 * | 10/2001 | Kampf et al. .................. 62/244 |

\* cited by examiner

*Primary Examiner*—Denise L. Esquivel
*Assistant Examiner*—Marc Norman
(74) *Attorney, Agent, or Firm*—Christensen O'Connor Johnson Kindness PLLC (57) ABSTRACT

An HVAC control system for a vehicle with multiple environmental zones includes a datalink between the control elements of the HVAC systems that regulate the climate in the multiple environmental zones. Control elements for the HVAC systems include an electronic control unit and a control head. A user of the HVAC control system may assign master status to the control head of the zone in which the user is located, and from that control head, control the environmental settings for HVAC systems servicing other zones in the vehicle. A data communication bus implemented in the vehicle may be used as the datalink.

27 Claims, 7 Drawing Sheets

HVAC CONTROL SYSTEM FOR A MULTIZONED VEHICLE

FIELD OF THE INVENTION

The present invention relates to control over heating, ventilation and air-conditioning systems in a vehicle, and more particularly to control over heating, ventilation and air-conditioning systems in a vehicle having multiple environmental zones.

BACKGROUND OF THE INVENTION

Many vehicles have two or more independent environmental zones serviced by separate heating, ventilation, and air-conditioning (HVAC) systems, each zone capable of possessing separate settings for temperature, air intake, ventilation and the like. One common example of a multizoned vehicle is a commercial freight truck that typically includes a cab zone containing the front seat and vehicle driving controls, and a sleeper zone where the driver and/or passenger can rest. The HVAC system for each zone is essentially separate with separately located HVAC controls. In some circumstances, limited on/off control of the sleeper zone HVAC system is available from the cab zone, and vice versa. However, in such circumstances, the only method for regulating the temperature in a zone other than the one in which the user is currently located is to cycle the HVAC system for the other zone on and off. This method is impractical and inefficient, especially in a vehicle. Accurate adjustment of the temperature of the sleeper zone, for example, requires the driver to stop the truck and physically move to the sleeper zone to change the temperature control.

Environmental zones with separate HVAC controls can also create undesirable drafts between the zones. Under cold climate conditions, for example, the cab zone HVAC system may push heated cab air up into an unheated sleeper zone. The warm air entering the upper area of the sleeper zone displaces the cool air toward the floor area of the sleeper zone, which then circulates back into the lower cab zone, causing a draft and discomfort to the operator's legs. If the sleeper zone HVAC system is turned on in order to heat the sleeper zone and counter the draft, the sleeper zone may eventually become warmer than the cab zone and cause drafts of warm air from the sleeper zone to raise the overall cabin temperature. Eventually, it becomes necessary for the driver to turn off the sleeper zone HVAC system in order to cool the cab zone.

The reverse may occur under warm climate conditions. The cab zone HVAC system may push cool air toward the bottom of a hot sleeper zone, displacing the warm air up and back to the cab zone onto the operator's head. Again, the operator can activate the sleeper zone HVAC system to cool the sleeper zone and counter the draft. The sleeper zone may eventually become cooler than the cab zone and cause the overall cabin temperature to go below the desired temperature setting. Again, it eventually becomes necessary for the driver to turn off the sleeper zone HVAC system in order to warm the cab.

A need therefore exists for an HVAC control system in a multizoned vehicle that provides an operator full control over the environment in any zone of the vehicle from any other zone. The present invention is directed to satisfying this need and other shortcomings in the prior art.

SUMMARY OF THE INVENTION

The present invention provides an HVAC control system for a multizoned vehicle that allows a user to control the HVAC system of any zone from any other zone. The HVAC system that regulates the environment in a particular zone is preferably controlled by an electronic control unit associated with the zone. The electronic control unit in each zone communicates with a corresponding control head that provides an interface between the user and the HVAC system of the zone. In accordance with the present invention, the control elements of a particular zone (i.e., the electronic control unit and control head) communicate with corresponding control elements (i.e., electronic control units or control heads) of the other zones by way of a datalink implemented in the vehicle. The invention may advantageously use an existing multiplexed data communication bus in the vehicle as the datalink.

According to one aspect of the invention, the electronic control unit and/or control head of a zone may assume a "master" or "slave" status. Each control head typically includes mechanisms for controlling temperature, airflow and other relevant settings. By assigning master status to the control elements of the zone in which the user is physically located, the user can control the settings for each HVAC system associated with other zones in the vehicle. A zone selection control is used to determine which zone's HVAC system is affected by the inputs to the control head.

According to another aspect of the invention, the control head may be composed of a control panel that includes automatic controls or manual controls for controlling the climate in a zone. The control panel may also include a combination of automatic and manual controls.

BRIEF DESCRIPTION OF THE DRAWINGS

The foregoing aspects and many of the attendant advantages of this invention will become more readily understood and appreciated by reference to the following detailed description, when taken in conjunction with the accompanying drawings, wherein.

DETAILED DESCRIPTION OF THE PREFERRED EMBODIMENT

Figure 1:
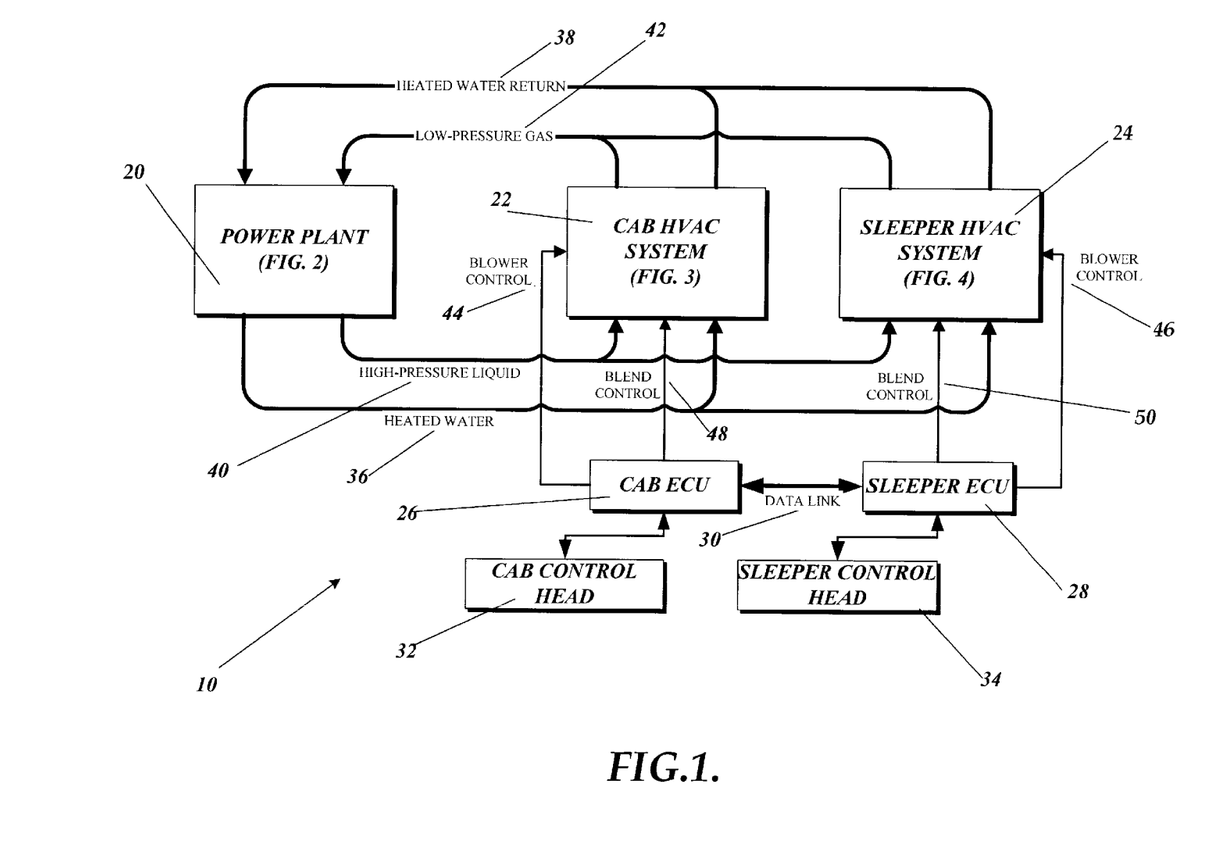
FIG. 1 is a block diagram of an HVAC control system constructed in accordance with one embodiment of the present invention.

FIG. 1 illustrates a vehicle HVAC control system 10 constructed according to an exemplary embodiment of the present invention. The HVAC control system 10 comprises an underhood HVAC power plant 20 that services a cab zone HVAC system 22 and a sleeper zone HVAC system 24. The underhood HVAC power plant 20 is connected to the cab zone HVAC system 22 and sleeper zone HVAC system 24 by way of an outgoing high-pressure liquid supply line 40, an outgoing heated water supply line 36, an incoming low-pressure gas supply line 42, and an incoming heated water return supply line 38. The high-temperature water provided by the heated water supply line 36 reenters the underhood HVAC power plant 20 by way of the heated water return supply line 38 after use by the cab zone HVAC system 22 and sleeper zone HVAC system 24. Likewise, the high-pressure liquid provided by the high-pressure liquid supply line 40 reenters the underhood HVAC power plant 20 in the form of low-pressure gas by way of the low-pressure gas supply line 42.

The operation of the cab zone HVAC system 22 is controlled by a cab electronic control unit 26. In the embodiment shown in FIG. 1, the cab electronic control unit 26 produces a blower speed control signal 44 and a blend control signal 48, both of which are discussed in more detail below. The cab electronic control unit 26 communicates with a cab control head 32 that provides an interface between the user of the vehicle and the environmental controls of the cab HVAC system. In a like manner, the sleeper zone HVAC system 24 is controlled by a sleeper electronic control unit 28 that, in this embodiment, produces a blower speed control signal 46 and a blend control signal 50. The sleeper electronic control unit 28 communicates with a sleeper control head 34 that provides an interface between the user of the vehicle and the environmental controls of the sleeper HVAC system. The control heads 32 and 34 may comprise manual control panels, automatic control panels, or a combination of both manual and automatic controls. Both manual and automatic control panels are discussed in greater detail below.

In FIG. 1, the cab electronic control unit 26 and sleeper electronic control unit 28 communicate with each other by way of a datalink 30. Computer technology has enabled electronically controlled devices in a vehicle to exchange control data or status information via a multiplexed data communication bus implemented in the vehicle. For heavy-duty vehicle applications, the Society of Automotive Engineers (SAE) has established a number of protocols to help standardize such data communication, e.g., SAE J1708/1587 and SAE J1939. The SAE J1939 protocol is an extended address protocol that conforms with the Controller Area Network (CAN) standard that is well-known in the industry.

The datalink 30 provides two-way communication between the electronic control units 26 and 28 for coordinating HVAC controls from the associated control heads 32 and 34. The datalink 30 may comprise any connection able to transmit and receive data. The HVAC control system 10 may advantageously use a preexisting data communication bus in the vehicle for the datalink 30. Those of ordinary skill in the art will readily recognize that many types of data communication links may be used for the datalink 30. For example, the datalink 30 may be comprised of a multiplexed data communication bus that conforms to the SAE J1939 data communication protocol. Alternatively, the datalink 30 may be comprised of a suitable wireless data communication connection.

In accordance with the present invention, a user may assign master status to the control elements of a particular zone and from that zone control the HVAC system in another zone. For example, while seated in the vehicle cab, a user may assign master status to the cab electronic control unit 26 and/or corresponding control head 32. The electronic control units and control heads in one or more of the other vehicle zones (e.g., the sleeper electronic control unit 28 and control head 34) would assume a slave status. In this configuration, the user is able to control the HVAC settings for each vehicle zone through the cab control head 32. The user-selected settings are communicated by way of the cab control head 32 to the cab electronic control unit 26, which in turn communicates the control information to the slave sleeper electronic control unit 28 by way of the datalink 30. Alternatively, the datalink 30 may directly connect the cab and sleeper control heads 32 and 34 to communicate control information from the control head with master status to the control head with slave status.

In FIG. 1, the control processes for each zone's HVAC system are implemented by the electronic control units (e.g., the cab electronic control unit 26 and the sleeper electronic control unit 28). Switch control, arbitration of control between zones, temperature settings, system status and other information is communicated between the electronic control units 26 and 28 (or control heads 32 and 34) by way of the datalink 30. FIG. 1 depicts an embodiment of the invention in which the electronic control units 26 and 28 are implemented separately from the control heads 32 and 34. Alternatively, the control heads 26 and 28 and the electronic control units 32 and 34 may be integrated into a single device for each zone.

Figure 2:
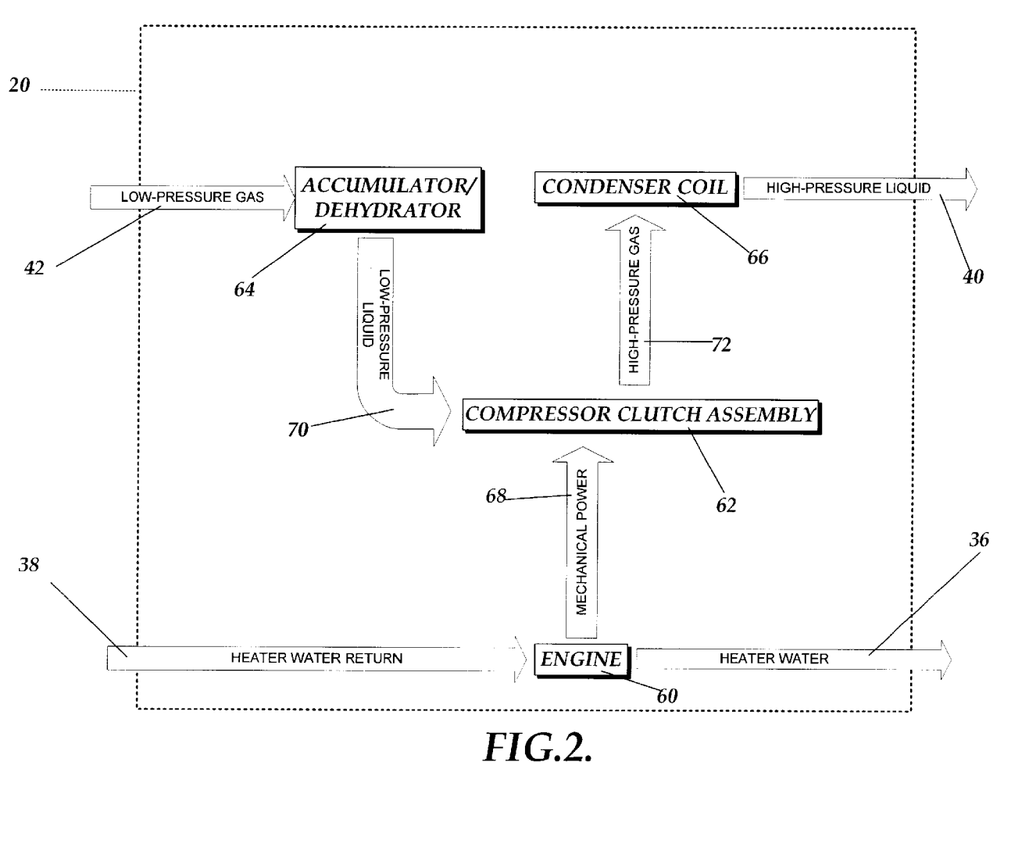
FIG. 2 is a block diagram illustrating the internal functionality of the underhood HVAC power plant depicted in FIG. 1.

FIG. 2 is a block diagram illustrating the internal functionality of the underhood HVAC power plant 20 depicted in FIG. 1. The underhood HVAC power plant 20 comprises an accumulator/dehydrator 64, a condenser coil 66, a compressor clutch assembly 62, and an engine 60. Water returned to the engine 60 through the heated water return supply line 38 is heated and provided to the vehicle's HVAC systems through the heated water supply line 36. In a parallel process, low-pressure gas provided to the accumulator/dehydrator 64 through the low-pressure gas supply line 42 is converted into a low-pressure liquid, which is supplied to the compressor clutch assembly 62 through the low-pressure liquid supply line 70. The compressor clutch assembly 62, in turn, utilizes the mechanical power 68 provided from the engine 60 to convert the low-pressure liquid into a high-pressure gas distributed by the high-pressure gas supply line 72. A condenser coil 66 converts this high-pressure gas into a high-pressure liquid that is distributed to the vehicle's HVAC systems through the high-pressure liquid supply line 40. Those of ordinary skill in the art will readily recognize that many other suitable configurations for powering the heating and cooling in vehicle HVAC systems may be utilized.

Figure 3:
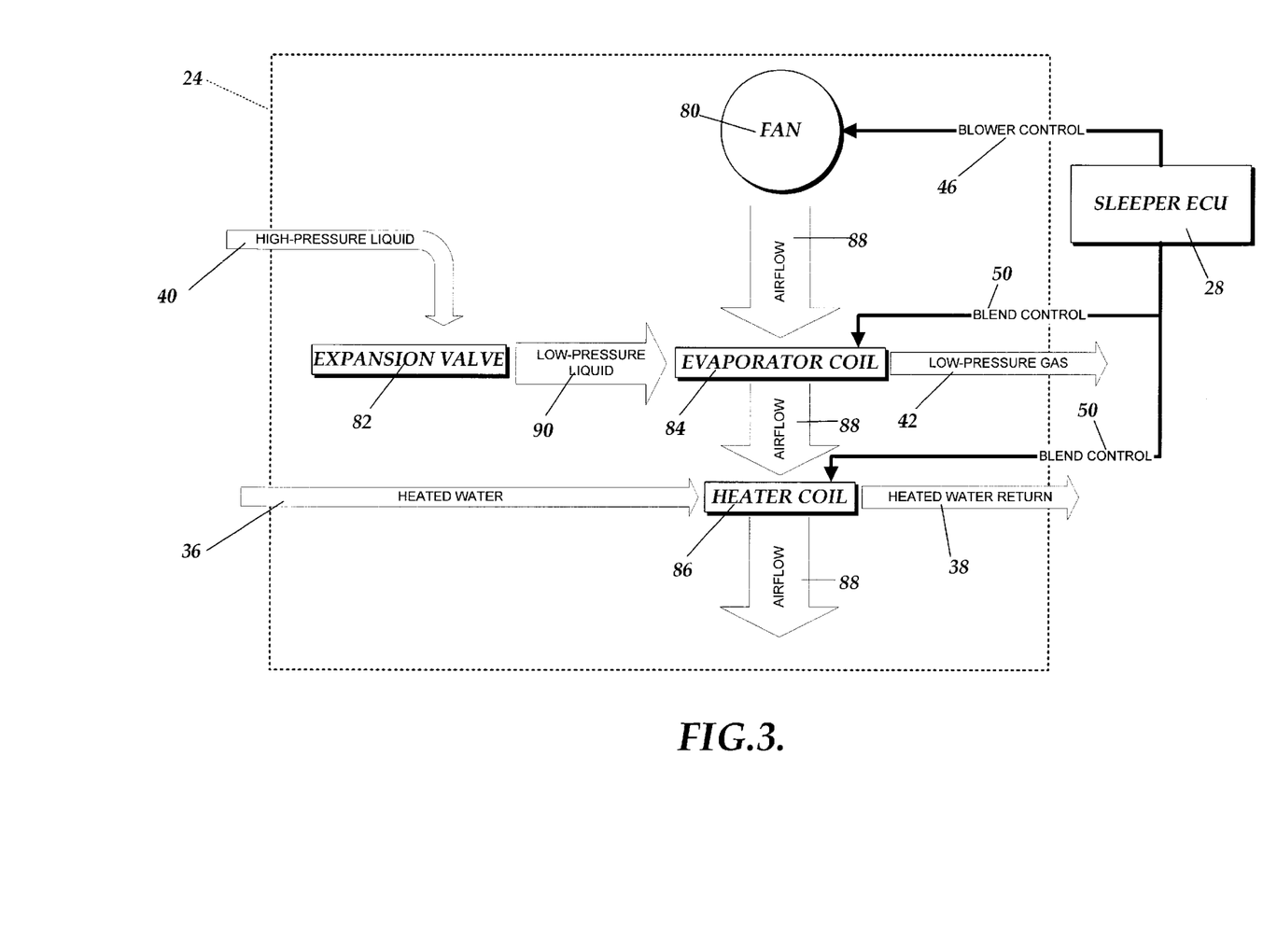
FIG. 3 is a block diagram illustrating the internal functionality of the sleeper zone HVAC system depicted in FIG. 1.

FIG. 3 is a block diagram illustrating the internal functionality of an exemplary sleeper zone HVAC system 24 as depicted in FIG. 1. The sleeper zone HVAC system 24 comprises a fan 80, a thermal expansion valve 82, an evaporator coil 84, and a heater coil 86. The sleeper electronic control unit 28 uses the blower speed control signal 46 and the blend control signal 50 to control the sleeper zone HVAC system 24. Incoming heated water from the engine 60 is provided to the heater coil 86 through the heated water supply line 36. The heater coil 86 returns said water to the engine 60 through the heated water return supply line 38. In a parallel manner, high-pressure liquid from the condenser coil 66 is provided to the thermal expansion valve 82 through the high-pressure liquid supply line 40. The thermal expansion valve 82 converts this high-pressure liquid into a low-pressure liquid which is passed to the evaporator coil 84 through the low-pressure liquid supply line 90. The evaporator coil 84 converts this low-pressure liquid into a low-pressure gas that is returned to the accumulator/dehydrator 64 through the low-pressure gas supply line 42.

Airflow 88 provided by the fan 80 passes over both the evaporator coil 84 and the heater coil 86. The blend control signal 50 controls the extent to which the evaporator coil 84 and the heater coil 86 are utilized in order to cool and heat said airflow 88. Likewise, the velocity at which airflow 88 passes over said evaporator coil 84 and heater coil 86 is determined by the rotational speed of fan 80, which is set by the blower control signal 46. Those of ordinary skill in the art will readily recognize that many other possible configurations for heating and cooling airflow within an HVAC system may be utilized.

Figure 4:
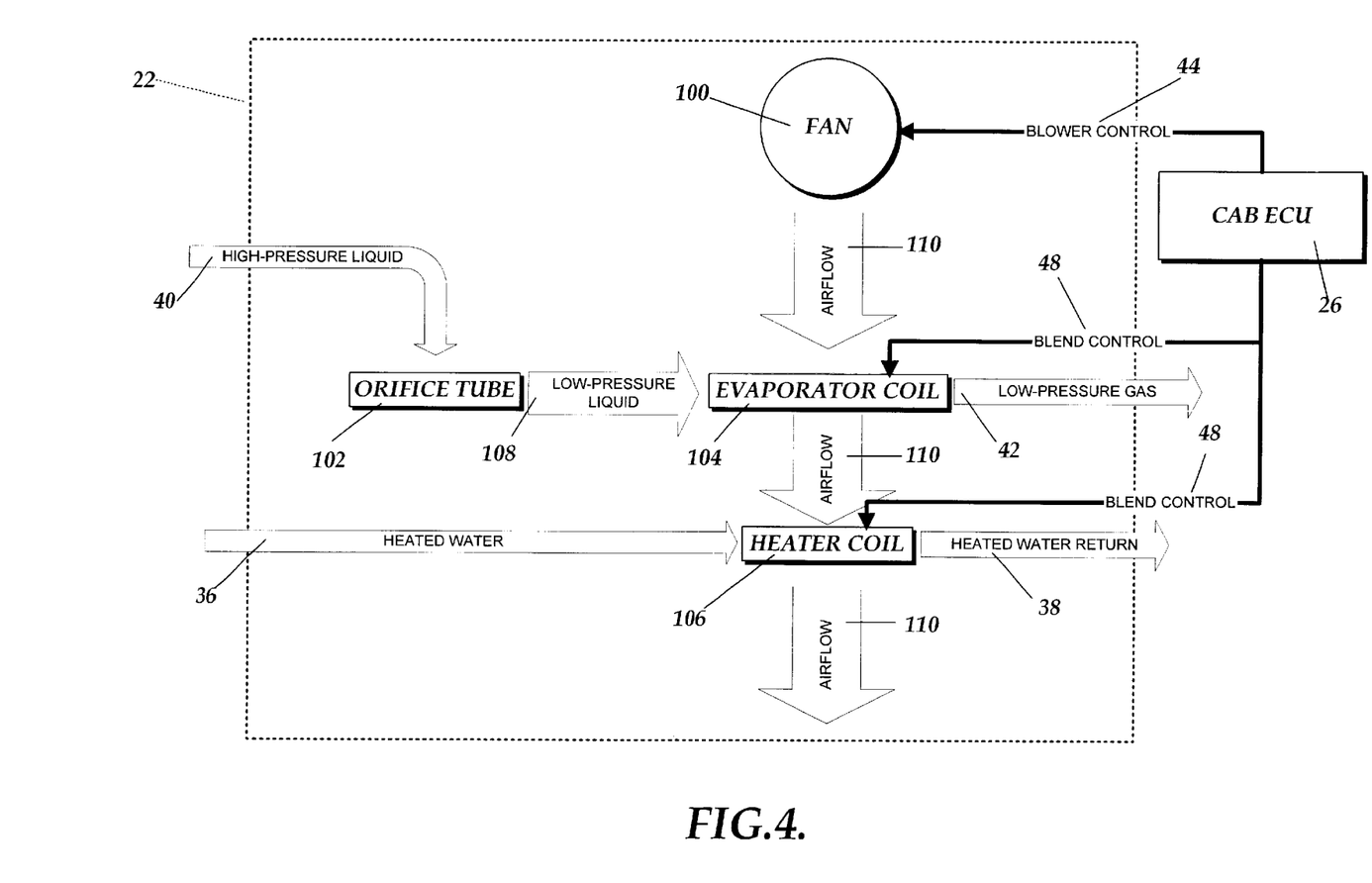
FIG. 4 is a block diagram illustrating the internal functionality of the cab zone HVAC system depicted in FIG. 1.

FIG. 4 is a block diagram illustrating the internal functionality of an exemplary cab zone HVAC system 22 as depicted in FIG. 1. The cab zone HVAC system 22 comprises a fan 100, an orifice tube 102, an evaporator coil 104, and a heater coil 106, and operates in a manner similar to the sleeper zone HVAC system 24. Heated water enters the cab zone HVAC system 22 from the engine 60 through the heated water supply line 36, and passes into the heater coil 106. The heater coil 106 passes said water back to the engine 60 through the heated water return supply line 38. In a parallel process, high-pressure liquid enters the orifice tube 102 through the high-pressure liquid supply line 40. The orifice tube 102, acting similar to the thermal expansion valve 82 (FIG. 3), converts the high-pressure liquid to a low-pressure liquid and passes said liquid to the evaporator coil 104 through the low-pressure liquid supply line 108. The evaporator coil 104 converts this low-pressure liquid into a low-pressure gas and passes it back to the accumulator/dehydrator 64 through the low-pressure gas supply line 42.

The fan 100 produces airflow 110 which passes over the evaporator coil 104 and the heater coil 106. The blend control signal 48 controls the extent to which evaporator coil 104 and heater coil 106 cool and heat airflow 110, respectively. Likewise, the velocity of airflow 110 is determined by the rotational speed of fan 100, which is controlled by the blower speed control signal 44. As with the sleeper zone HVAC system 24, those of ordinary skill in the art will readily recognize that many other possible configurations for heating and cooling airflow within an HVAC system may be utilized. The cab electronic control unit 26 and sleeper electronic control unit 28 may also advantageously control the direction of the airflow 88, 110 that is output from the system 22, 24 (e.g., through a defrost duct, panel duct, floor duct, etc.) via a mode selection control signal communicated to a mode box (not shown). The mode box, in turn, mechanically adjusts passages for the airflow in accordance with the mode selection control signal.

Figure 5:
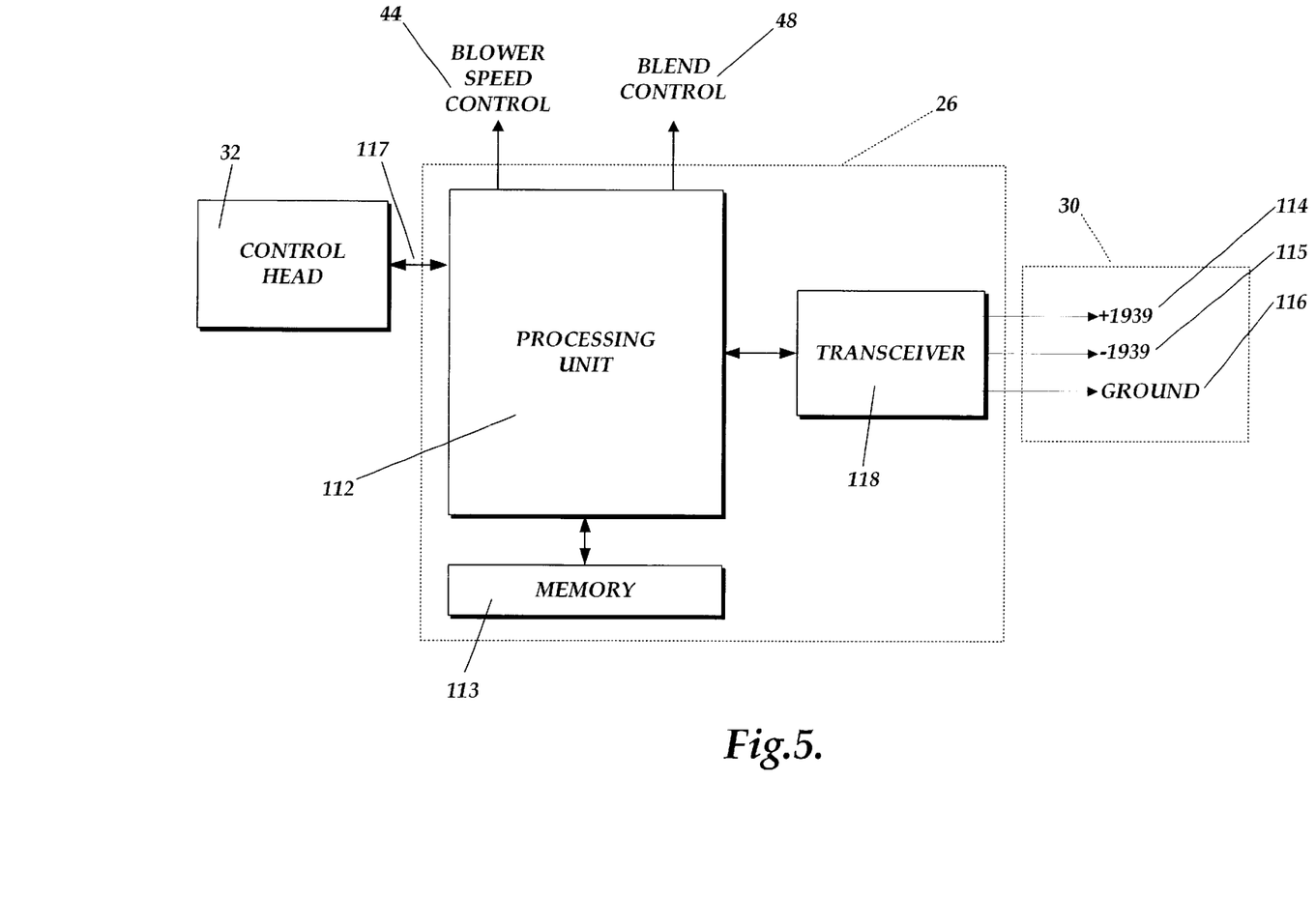
FIG. 5 is a block diagram illustrating the internal functionality of the cab zone electronic control unit and datalink depicted in FIG. 1.

In FIG. 5, an exemplary embodiment of the cab electronic control unit 26 is shown including a processing unit 112 a memory 113, and a transceiver 118. The processing unit 112 receives user input from the cab control head 32 through communication connection 117, and can receive and output data messages via the transceiver 118 to the datalink 30.

If necessary, the transceiver 118 formats the data messages received from the processing unit 112 prior to transmission to conform the data messages to the data transmission protocol that governs the datalink communication. For example, in FIG. 5, the datalink 30 includes three bus lines 114, 115, and 116 labeled +1939,−1939, and ground, respectively, that conform with the SAE J1939 standard. The transceiver 118 formats the data messages received from the processing unit 112 in accordance with SAE J1939 protocol. In other embodiments of the invention, the transceiver 118 may be configured to format data messages for transmission according to other standards, such as SAE J1708/1587, Inter-Integrated Communications ($I^2$ c), Universal Serial Bus (USB), etc., depending on the type of data bus used for the datalink 30.

A communications driver portion of the transceiver 118 drives the actual transmission of the data messages. For example, if a J1939 data bus is used for the datalink 30, the communications driver portion of the transceiver 118 sets the voltage levels on the bus lines 114 and 115 in accordance with RS-485 standard. Data messages sent by the processing unit 112 via the datalink 30 are received by other electronic control units, such as the sleeper electronic control unit 28, connected to the datalink 30, as shown in FIG. 1. Likewise, the cab electronic control unit 26 receives data messages from other electronic control units by way of the datalink 30 and responds appropriately, e.g., by sending control signals to the cab zone HVAC system 22 (FIG. 1) through blower speed control signal 44 and/or blend control signal 48.

The transceiver 118 may be a single integrated device or may be constructed using various components, e.g., a communications driver and receiver circuit that is separate from a data formatting circuit. The transceiver 118 may also include a memory (e.g., a random-access memory or a register) to temporarily store data messages. The transceiver 118 may also be integrated with the processing unit 112. Although FIG. 5 depicts the cab zone electronic control unit 26 and related components, the construction and operation of the sleeper zone electronic control unit 28 is similar for the same embodiment of the invention.

Figure 6:
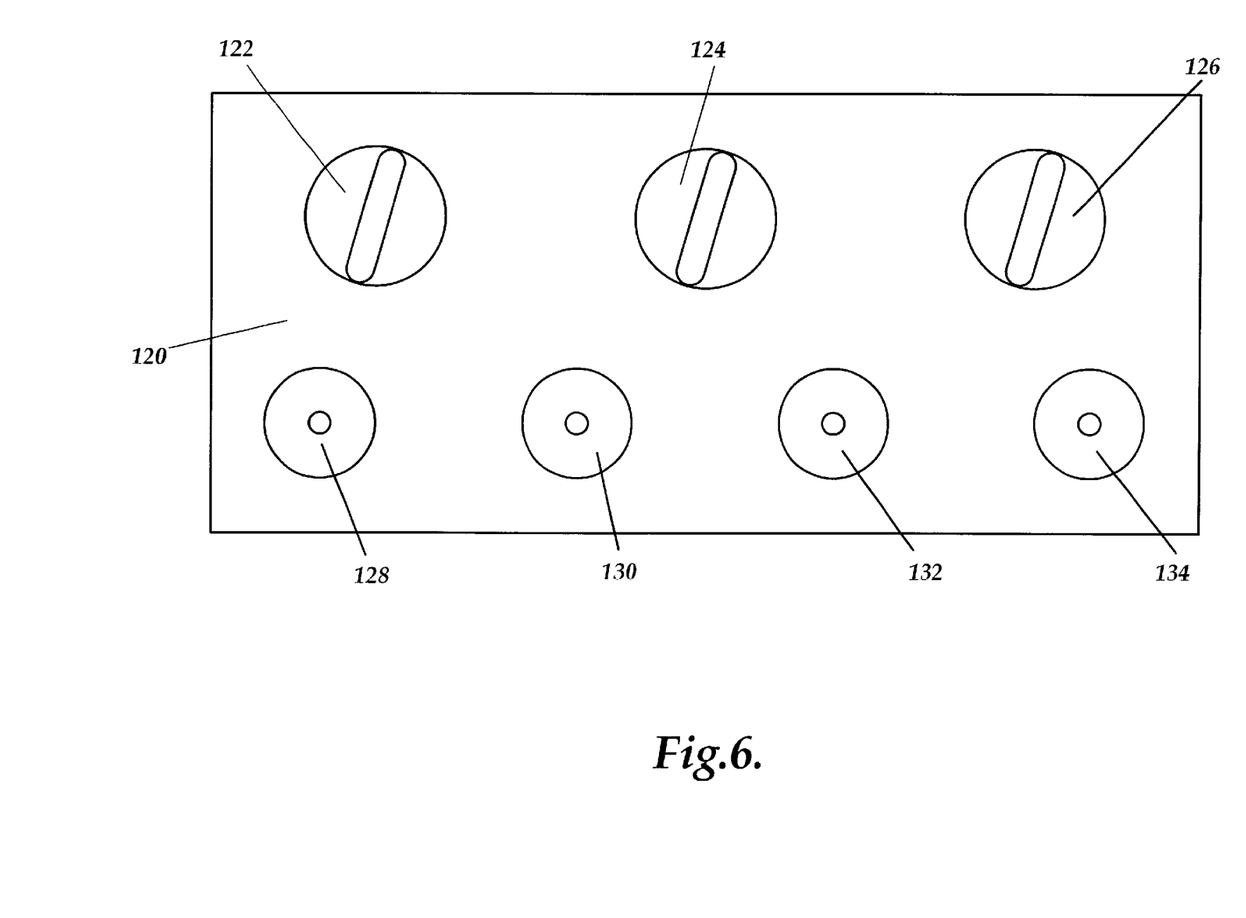
FIG. 6 is a pictorial diagram illustrating an embodiment of the invention wherein the cab or sleeper control heads depicted in FIG. 1 comprise a manual control panel.

FIG. 6 is a pictorial diagram illustrating an exemplary embodiment of the invention wherein either or both control heads 32 and 34, as shown in FIG. 1, comprise a manual control panel 120. The manual control panel 120 shown in FIG. 6 comprises a collection of controls, such as a temperature control 122, an air outlet selection control 124, and a blower speed control 126, each of which is depicted, for example, as a rotary knob. The manual control panel 120 further comprises an air-conditioning toggle control 128, a vehicle zone selection control 130, a master/slave toggle control 132, and a fresh/recirculating air toggle control 134, each of which is depicted, for example, as a pushbutton switch.

The temperature control 122 allows the vehicle user to adjust the temperature. The air outlet selection control 124 allows the user to select from multiple ventilation outlets, such as those often present along the vehicle dashboard or near the vehicle floorboards, while the blower speed control 126 allows the user to adjust the velocity of air emitted from said outlets. The air-conditioning control 128 allows the user to toggle activation of the vehicle's air-conditioning system, while the fresh/recirculating air control 134 allows the user to select the method of air intake to the vehicle HVAC systems.

The master/slave control 132 allows the user to assign master control to the control panel over other HVAC systems in the vehicle. The master/slave control 132 preferably gives a visual indication that the panel has assumed master control status. As depicted, the vehicle zone selection control 130 takes the form of a pushbutton switch that allows the user to select the particular vehicle zone over which the control panel 120 has control. In one embodiment of the invention, the vehicle possesses two independent zones, such as sleeper and cab zones, and therefore only two zone selection possibilities are necessary. In other embodiments of the invention where the vehicle possesses three or more independent zones, additional zone selection possibilities are enabled with additional or different type of switches (e.g., a rotary dial switch).

Arbitration is required to coordinate control of the HVAC system in one zone from another zone regardless of the control selections that were previously made in the other zone. For example, a vehicle operator who leaves the sleeper zone controls set in one condition and subsequently moves to the driver's seat in the cab should not have to stop the vehicle and relocate to the sleeper to manually alter the settings in the sleeper zone. The vehicle operator instead asserts master control of the sleeper zone's HVAC system from the cab zone control head by pressing the master/slave control 132 and designating the sleeper zone using the zone selection control 130. In an alternative embodiment, the operator may choose to control the environment in all zones simultaneously, causing the HVAC systems of the vehicle to operate in unison and effectively treat the vehicle as a single environmental zone. The operator would assign master control to the local control head and designate all zones using the zone selection control.

When the vehicle operator assigns master status to the cab control head 32 using the master/slave control 132, this action cancels any previous assignment of master status to the control head for the zone to be controlled. Pressing the vehicle zone selection control 130 on the cab control head 32 enables control of the sleeper zone HVAC system 24. At that point, the temperature control 122, the air outlet selection control 124, the blower speed control 126, the air-conditioning toggle control 128, and the fresh/recirculating air toggle control 134 all operate to control the sleeper zone HVAC system 24 rather than the cab zone HVAC system 22. To control the cab zone HVAC system 22 from the cab control head 32, the operator would push the vehicle zone selection control 130 again to designate the cab zone and direct the control settings to the cab zone HVAC system 22. As noted earlier, other embodiments of the invention may permit the vehicle operator to direct the control settings to two or more zone HVAC systems simultaneously.

Figure 7:
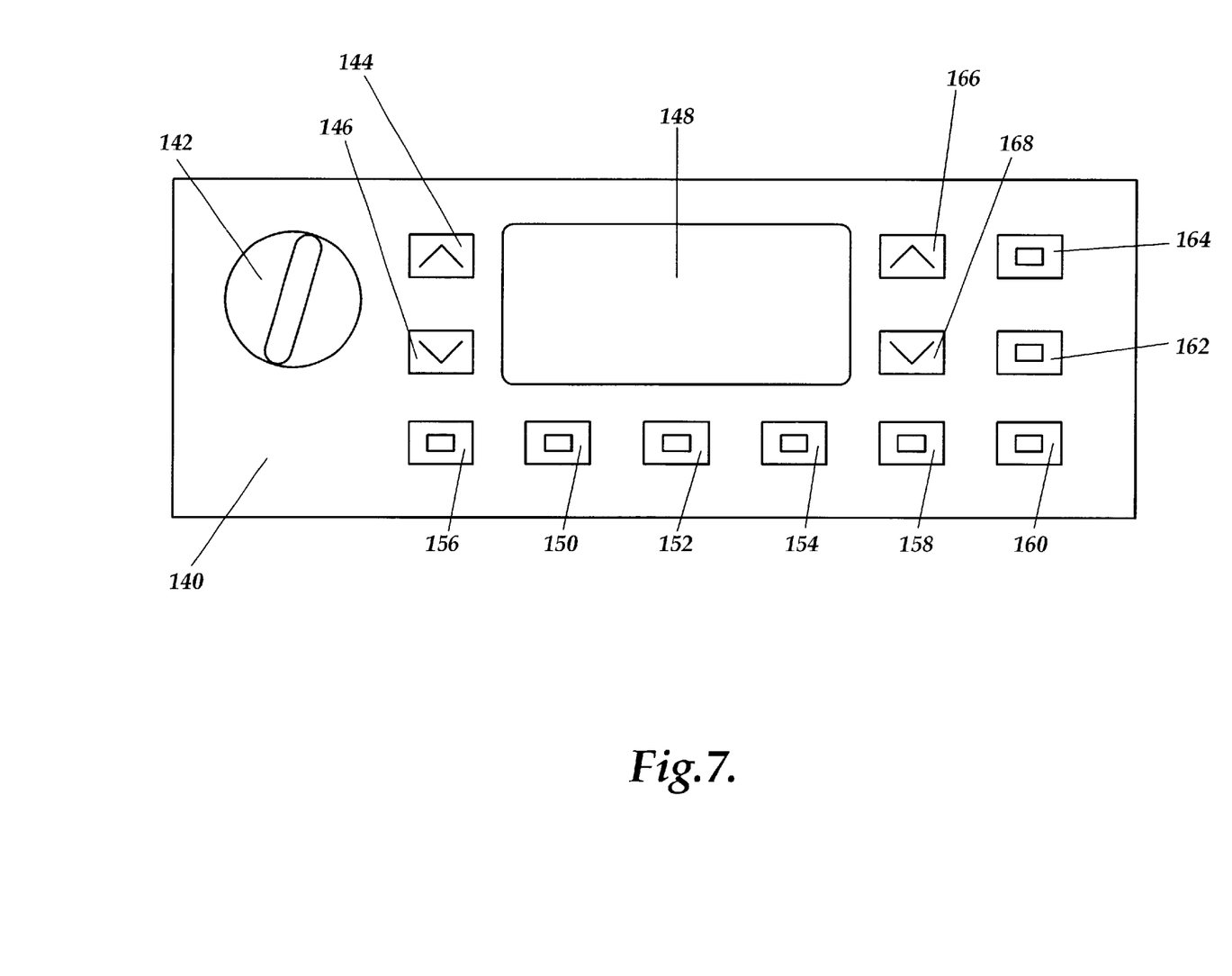
FIG. 7 is a pictorial diagram illustrating an embodiment of the invention wherein the cab or sleeper control heads depicted in FIG. 1 comprise an automatic control panel.

FIG. 7 is a pictorial diagram illustrating an exemplary embodiment of the invention in which one or both control heads 32 and 34 as depicted in FIG. 1 comprise an automatic control panel 140. The automatic control panel 140 comprises a temperature control 142, depicted as a rotary knob; blower speed controls 144 and 146, depicted as "up" and "down" pushbuttons; a data display screen 148; time setting controls 166 and 168, depicted as "up" and "down" pushbuttons; an air-conditioning toggle control 156, air outlet selection controls 150, 152, and 154, a fresh/recirculating air control toggle 158, a vehicle zone selection control 160, a master/slave toggle control 162, and a time operation mode control 164, each of which is depicted as a pushbutton.

Controls such as the temperature control 142, the blower speed controls 144 and 146, the air-conditioning control 156 and the air outlet selection controls 150, 152, and 154 operate in a manner similar to that described with respect to FIG. 6. The display screen 148 typically provides information regarding system settings and status, although said display is not limited to such functionality. The time setting controls 166 and 168 are used to schedule time operations such as alarms, scheduled engine operations, and scheduled HVAC operations. The time operations mode control 164 allows the user to determine what the time setting controls 166 and 168 are set to adjust.

The zone selection control 160 allows the user to designate which HVAC system is under the control of the automatic control panel 140. The master/slave toggle control 162 allows the user to assign master status to the zone in which the user is currently located. The operation of the master/slave control 162, in conjunction with the zone selection control 160, is similar to that described above for the manual control panel 120. Those of ordinary skill in the art will readily recognize that any combination of these or similar functions may be utilized in the construction of the automatic control panel 140. As in the case of manual control panel 120, the control processes for each zone's HVAC system that relate to the controls provided by the automatic control panel 140 are generally implemented by the electronic control units 26 and 28.

The master/slave toggle control 132 (FIG. 6) and 162 (FIG. 7), in conjunction with the zone selection control 130 (FIG. 6) and 160 (FIG. 7), provide an arbitration control scheme in accordance with one embodiment of the invention. Appropriate arbitration is provided by the invention regardless of the control panel implementation that is used: manual control panel 120, automatic control panel 140, or some hybrid combination of the two. Moreover, zone selection controls appearing on the control panels as toggle switches or buttons are particularly suited for implementation of the present invention where the vehicle has two independent zones. In other embodiments of the invention where the vehicle has three or more independent zones, zone selection controls providing additional settings are easily facilitated using standard control techniques and devices.

While various embodiments of the invention have been illustrated and described above, it will be appreciated that insubstantial changes can be made therein without departing from the spirit and scope of the invention. For example, embodiments of the invention shown above include HVAC systems that are powered by the same underhood power plant. Other embodiments may involve HVAC systems powered by separate power plants. The invention also may be used in other types of vehicles having multiple environmental zones whose respective climates are independently controlled: (e.g., motor homes, vans, buses, taxicabs, and the like). Such vehicles may benefit from the advantages of the invention, which include reducing drafts, unifying environmental controls, reducing wiring, enhancing driver and passenger comfort, and more consistent climate control. The invention, therefore, should be determined by the following claims and equivalents thereto.

The embodiments of the invention in which an exclusive property or privilege is claimed are defined as follows:

1. A control system for controlling HVAC systems in a vehicle having multiple zones, comprising:

(a) a first climate control system associated with a first zone in the vehicle, the first climate control system having a control head for controlling a first HVAC system that regulates the climate in the first zone;

(b) a second climate control system associated with a second zone in the vehicle, the second climate control system having a control head for controlling a second HVAC system that regulates the climate in the second zone; and (c) a datalink providing communication between the first climate control system and the second climate control system, said datalink enabling the control head of the first zone to control the HVAC system of the second zone.

2. The control system of claim 1, wherein the datalink further enables the control head of the second zone to control the HVAC system of the first zone.

3. The control system of claim 1, wherein the first and second climate control systems each further include an electronic control unit in communication with the first and second control heads, respectively, for controlling the first and second HVAC systems, wherein the datalink enables communication between the electronic control units of the first and second climate control systems.

4. The control system of claim 1, wherein the datalink enables communication between the control heads of the first and second zones.

5. The control system of claim 1, wherein the control heads of the first and second zones are configured to assume a master or slave status relative to the zones of the vehicle.

6. The control system of claim 5, wherein the control head of the first zone is configured to assume master status relative to the second zone, causing the control head of the second zone to assume slave status.

7. The control system of claim 5, wherein the control head of the second zone is configured to assume master status relative to the first zone, causing the control head of the first zone to assume slave status.

8. The control system of claim 1, wherein the control heads of the first and second zones are each comprised of a control panel that is operable by a user of the vehicle to control the climate of the first and second zones.

9. The control system of claim 8, wherein the control panel enables automatic climate control of the zone over which it has control.

10. The control system of claim 8, wherein the control panel enables manual climate control of the zone over which it has control.

11. The control system of claim 1, wherein the datalink is comprised of a wireless data communication connection.

12. The control system of claim 1, wherein the datalink enables the control head of the first zone to simultaneously control the HVAC systems of two or more zones in the vehicle.

13. A climate control system for a vehicle having multiple zones, comprising:
    (a) for each zone in the vehicle, an HVAC system and associated control head that regulates the climate in the zone, the control head for each zone capable of assuming a master or slave status, wherein master status for a control head in a zone permits the control head to control the HVAC system of another zone; and
    (b) a datalink providing communication between the zones, the datalink enabling the control head for a first zone to assume master status over a second zone and control the HVAC system of the second zone.

14. The climate control system of claim 13, wherein the datalink further enables the control head for the second zone to assume master status over the first zone and control the HVAC system of the first zone.

15. The climate control system of claim 13, wherein the control head for a zone is comprised of a control panel capable of providing automatic climate control for the zone.

16. The climate control system of claim 13, wherein the control head for a zone is comprised of a control panel that provides manual control of the climate of the zone.

17. The climate control system of claim 13, wherein the HVAC systems for two or more zones share the same power plant in the vehicle.

18. The climate control system of claim 13, wherein the HVAC systems for two or more zones are separately powered.

19. The climate control system of claim 13, wherein the datalink is comprised of a wireless data communication connection.

20. The climate control system of claim 13, wherein the HVAC system for each zone further has a corresponding electronic control unit, and wherein the control head for each zone is configured to control the operation of an HVAC system for a zone by communicating with the zone's corresponding electronic control unit.

21. The climate control system of claim 20, wherein the datalink enables communication between the electronic control units of the zones.

22. The climate control system of claim 13, wherein the datalink enables direct communication between the control heads of the zones.

23. A method of controlling HVAC systems in a vehicle having multiple zones, wherein each zone in the vehicle has an HVAC system that regulates the climate in the zone, the method comprising:
    (a) providing a control head for each HVAC system in the vehicle, each control head having the capacity to assume a master or slave status;
    (b) providing a datalink between the zones, the datalink enabling the zones to coordinate control of the HVAC systems according to the master or slave status assumed by the control heads;
    (c) directing the control head for a first zone to assume master status relative to a second zone and control the HVAC system of the second zone via the datalink; and
    (d) directing the control head for the second zone to assume slave status and relinquish control of the HVAC system of the second zone to the control head for the first zone.

24. The method of claim 23, further comprising directing the control head for the first zone to assume master status relative to two or more zones and control the HVAC systems in the two or more zones simultaneously.

25. The method of claim 23, wherein providing a datalink between the zones includes connecting the control heads for the zones to a data communication bus implemented in the vehicle.

26. The method of claim 23, further comprising providing an electronic control unit for each HVAC system in the vehicle, wherein the electronic control unit for a zone controls the operation of the HVAC system for the zone, and wherein providing a datalink between the zones includes connecting the electronic control units for the zones to a data communication bus implemented in the vehicle.

27. The method of claim 23, wherein directing the control head for the first zone to assume master status automatically causes the control head for the second zone to assume slave status.

* * * * *